United States Patent [19]

Laskaris et al.

[11] Patent Number: 5,427,181
[45] Date of Patent: * Jun. 27, 1995

[54] MIXER FOR COMPRESSED AIR FOAM SYSTEM

[75] Inventors: Michael A. Laskaris, Collegeville; Daniel S. Borgnis, Schwenksville; Mario D. DiLisi, Lansdale; David L. Miller, Conshohocken, all of Pa.

[73] Assignee: Hale Fire Pump Company, Conshohocken, Pa.

[*] Notice: The portion of the term of this patent subsequent to Oct. 26, 2010 has been disclaimed.

[21] Appl. No.: 76,586

[22] Filed: Jun. 14, 1993

[51] Int. Cl.⁶ ............................................. A62C 35/00
[52] U.S. Cl. ..................................... 169/14; 169/15; 169/24; 366/336; 403/337
[58] Field of Search ................... 366/336, 337, 338; 403/312, 335, 337; 285/134, 136, 368; 169/13, 14, 15, 16, 24, 44

[56] References Cited

U.S. PATENT DOCUMENTS

| | | | |
|---|---|---|---|
| 2,183,561 | 12/1939 | Hamblin | 261/76 |
| 3,336,055 | 8/1967 | Pall et al. | 285/368 X |
| 3,923,288 | 12/1975 | King | 366/336 |
| 4,034,965 | 7/1977 | King | 366/336 |
| 4,121,532 | 10/1978 | Coryell, III | 403/337 X |
| 4,614,440 | 9/1986 | King | 366/336 |
| 5,145,014 | 9/1992 | Eberhardt | 169/14 |
| 5,255,747 | 10/1993 | Teske et al. | 169/15 |

FOREIGN PATENT DOCUMENTS

| | | | |
|---|---|---|---|
| 589655 | 12/1959 | Canada | 169/14 |
| 2079614 | 1/1982 | United Kingdom | 366/338 |

Primary Examiner—Andrew C. Pike
Attorney, Agent, or Firm—Frank A. Follmer

[57] ABSTRACT

A system for supplying compressed air and foam solution to produce a fire stream comprising an aerated foam includes a motionless mixer having an in-line chamber wherein the air and foam solution are mixed thoroughly in a short distance with a minimal pressure drop to produce an effective firefighting foam.

13 Claims, 5 Drawing Sheets

MIXER FOR COMPRESSED AIR FOAM SYSTEM

FIELD OF THE INVENTION

This invention relates generally to mixers for use in a system for supplying compressed air and foam to produce a fire stream comprising an aerated foam.

BACKGROUND OF THE INVENTION

Foam supply systems of the above-indicated type are known in the art by the term CAFS (Compressed Air Foam System) and WEPS (Water Expansion Pumping System). A typical system includes a foam injector system, a water pumping system, and an air system including an air compressor for supplying air under pressure. For example, when employing mixture ratios of 1 CFM of air to 1 GPM of water, these systems can produce very desirable results in fire fighting by the use of "Class A" or "Class B" foams to help achieve fire suppression and to deal with increased fire loads and related hazards.

Compressed air foam systems of the indicated type also generally include a device, such as a venturi, whereat the compressed air and foam solution are combined and an arrangement whereby the combined flow is delivered through a mixing device to a fire stream delivery means. The purpose of the mixer is to create a mixing action to produce a foam as the mixture of foam solution and air flow from the venturi to the upstream end of the fire delivery means. The mixer is particularly useful when the fire stream delivery means is a deck gun arrangement, in which case there is a minimum length of pipe between the venturi means and the inlet to the fire stream delivery means. Mixers of this type are known in the art as stationary or motionless mixers and function to enhance mixing by adding turbulence to the flow while keeping the pressure loss as low as possible.

One compressed air foam system of the above-indicated type is disclosed in U.S. Pat. No. 5,255,747, assigned to Hale Fire Pump Company. The mixer employed in the system disclosed in said patent comprises a stationary mixer which is provided with a plurality of vanes which function to create turbulence without an excessive pressure drop as the mixture of foam solution and air flow from a venturi to the upstream end of a fire hose.

Mixers of the above-described type are also disclosed in U.S. Pat. Nos. 3,923,288 and 4,034,965. These patents disclose a vane type of mixer similar to that disclosed in U.S. Pat. No. 5,255,747. The mixing vanes of the mixer disclosed in these patents are constructed and arranged so that the vanes overlap to provide a plurality of axially overlapping regions which provide a mixing matrix introducing complex velocity vectors onto the materials being mixed, the design being such that the material flowing through the conduit defined by the mixer is directed through a substantial radial displacement over a short distance, each main element imparting a rotational vector to the material stream which is then transformed to a lateral or radial vector. U.S. Pat. No. 4,614,440 discloses a stationary mixer of the indicated type which comprises a mixing apparatus in the shape of a conduit made up of individual biscuit sections, each of which contains a plurality of openings therethrough containing mixing elements which induce a rotational angular velocity to the fluid stream.

The main disadvantage of the mixers in use today, which are typified by the prior art mixers discussed above, is that while a good mixing of the fluids is achieved, this is achieved at the expense of a substantial pressure drop. Another disadvantage is the undue complexity in the design of the prior art mixers.

SUMMARY OF THE INVENTION

It is the general object of the invention to provide a motionless mixer for use in a compressed air foam system for firefighting applications constructed to achieve effective mixing of the air and foam solution to produce an effective firefighting foam with a minimum pressure drop.

Another object of the invention is to provide a mixer of the above-indicated type which is designed to provide simplicity of manufacture and use.

Briefly stated, the mixer, in accordance with the invention, is constructed of a plurality of flange members joined together to define a cylindrical in-line mixing chamber. Each flange member has a cylindrical hole in the center thereof extending in an axial direction to define a mixing chamber section and a plurality of fingers extending radially inwardly into said mixing chamber section. The radially extending fingers are constructed and arranged to provide turbulence in the flow stream to produce a plurality of vortices which comprise the mixing action. This mixing action ensures that the compressed air and the foam solution are mixed together thoroughly so that the fire stream delivered from the end of the fire hose, or the like, is comprised of foam bubbles and this fire stream does not contain any "slug flow". Moreover, this mixing action is achieved with a minimum of pressure drop through the mixer.

These desirable results are particularly important in compressed air foam systems, such as those provided on fire trucks, wherein there is a short length of piping between the point where the compressed air and foam solution are joined together and the point where the fire stream is discharged from the delivery device toward the fire. If adequate mixing between these two points is not achieved, it is possible that the flow will comprise "slug flow", which type of flow involves the discharge of distinct pockets of water and of air due to the insufficient mixing of foam solution and air. "Slug flow" is unacceptable in firefighting applications because it results in the depositing of raw air onto the fire and/or dangerous hose pulsations. In firefighting applications involving foam, it is essential that the air be entrained in foam bubbles in order for the foam to be effective in achieving fire suppression, vapor sealing, and other firefighting objectives.

Because of the construction in accordance with invention whereby there is a lower pressure drop as compared with the vane type devices of the prior art discussed above, the resulting decrease of the loss of energy in the fluid flow through the mixer means that there is more energy left at the end of the fire hose to propel the fire stream farther and to put out the fire more effectively. Furthermore, the mixer design of the invention produces a better bubble structure than that of the prior art mixers. In firefighting with foams, it is important that the bubble structure comprises many small, uniform diameter bubbles as opposed to a few large, mixed diameter bubbles, and this is achieved by the turbulent action induced by the fingers sticking into the fluid flow through the mixer as discussed above.

DETAILED DESCRIPTION OF THE PREFERRED EMBODIMENT

Figure 1:
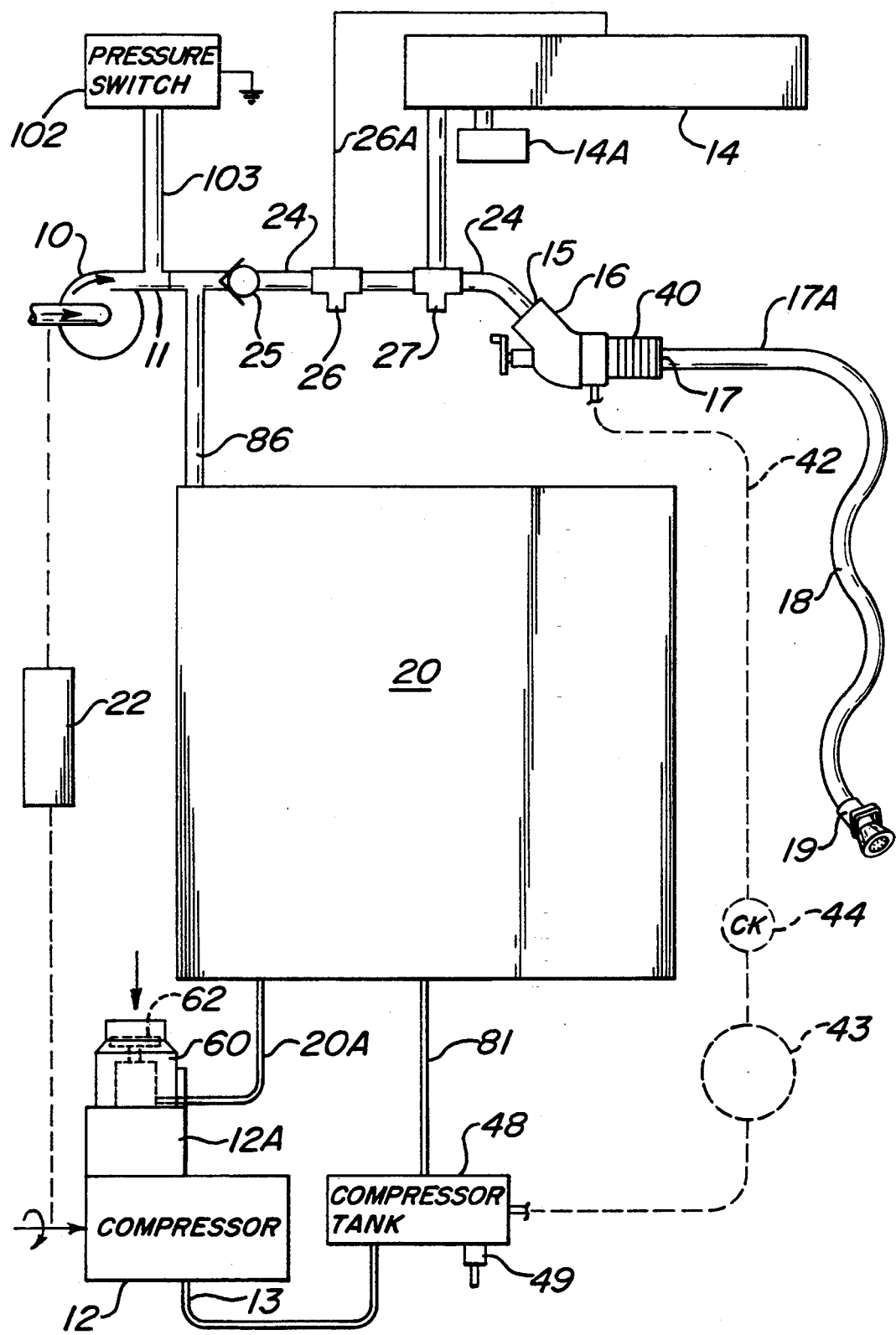
FIG. 1 is a schematic view of a compressed air foam system comprising a motionless mixer in accordance with the invention.

The main components of the compressed air foam system are a fire pump 10, an air compressor 12, a foam proportioner 14, a venturi means 16, a mixer 40, a fire stream delivery means 18, and an air control means 20 for regulating the pressure of the air supplied to the venturi means 16. The comprised air foam system shown in FIG. 1 is the same as that disclosed in U.S. Pat. No. 5,255,747 except that the improved mixer 40 in accordance with the invention is used instead of the vane type of mixer disclosed therein.

Fire pump 10 is a suitable water pump which delivers water under pressure from a discharge 11 thereof. Fire pump 10 may comprise, by way of example, a QG 150 midship pump manufactured by Hale Fire Pump Company, said pump being a two-stage centrifugal pump which has impellers mounted on a rotating drive shaft.

Air compressor 12 is preferably a sliding-vane type of rotary compressor of a conventional construction and comprises a rotating drive shaft. By way of example, compressor 12 is constructed to operate at up to 400 cubic feet per minute. The drive for compressor 12 may include a clutch means which can be disengaged when it is desired to prevent operation of the compressor 12.

A transmission means 22 of the type disclosed in U.S. Pat. No. 5,145,014 is provided to cause rotation of the drive shafts of both the fire pump 10 and compressor 12 from the transmission on the fire truck. As is described in said patent, transmission means 22 includes a split shaft gear box arranged to cause rotation of the drive shafts of the fire pump 12 and compressor 12 whereby said shafts are caused to rotate at a set proportional speed.

There is provided a water supply conduit means 24 for delivering water under pressure from the pump discharge 11 to the inlet 15 of the venturi means 16. Such means comprises a flow line extending between discharge 11 of fire pump 10 and the inlet 15 of venturi means 16 and having connected therein, in the direction of flow, a check valve 25, a flowmeter 26, and an injector 27. Check valve 25 is constructed and arranged to permit flow in the direction from discharge 11 to the inlet 15 of the venturi means 16 and block flow in the opposite direction. Flowmeter 26 and injector 27 are connected as part of the flow proportioner 14 as will be described hereafter.

Flow proportioner 14 may be of any suitable type well known in the art, such as the one used in the Foam-Pro 2001 series electronic injection automatic foam proportioning system manufactured by Hypro Corporation of New Brighton, Minn. In this type of system, foam proportioner 14 is constructed to comprise a foam concentrate pump and a motor for driving the pump. This type of system operates to monitor the water flow through the flowmeter 26. In operation, in response to an electrical signal transmitted via control means 26A to the foam proportioner motor, the amount of the foam concentrate delivered from a foam concentrate supply tank 14A to conduit means 24 through the injector 27 is controlled to be at a specified injection rate pursuant to the setting of the system. In order to protect the pump and motor of this system, there is typically provided an arrangement whereby the pump is interlocked with a foam concentrate supply tank float switch so that if the tank 14A is empty, said pump will not run.

Figure 2:
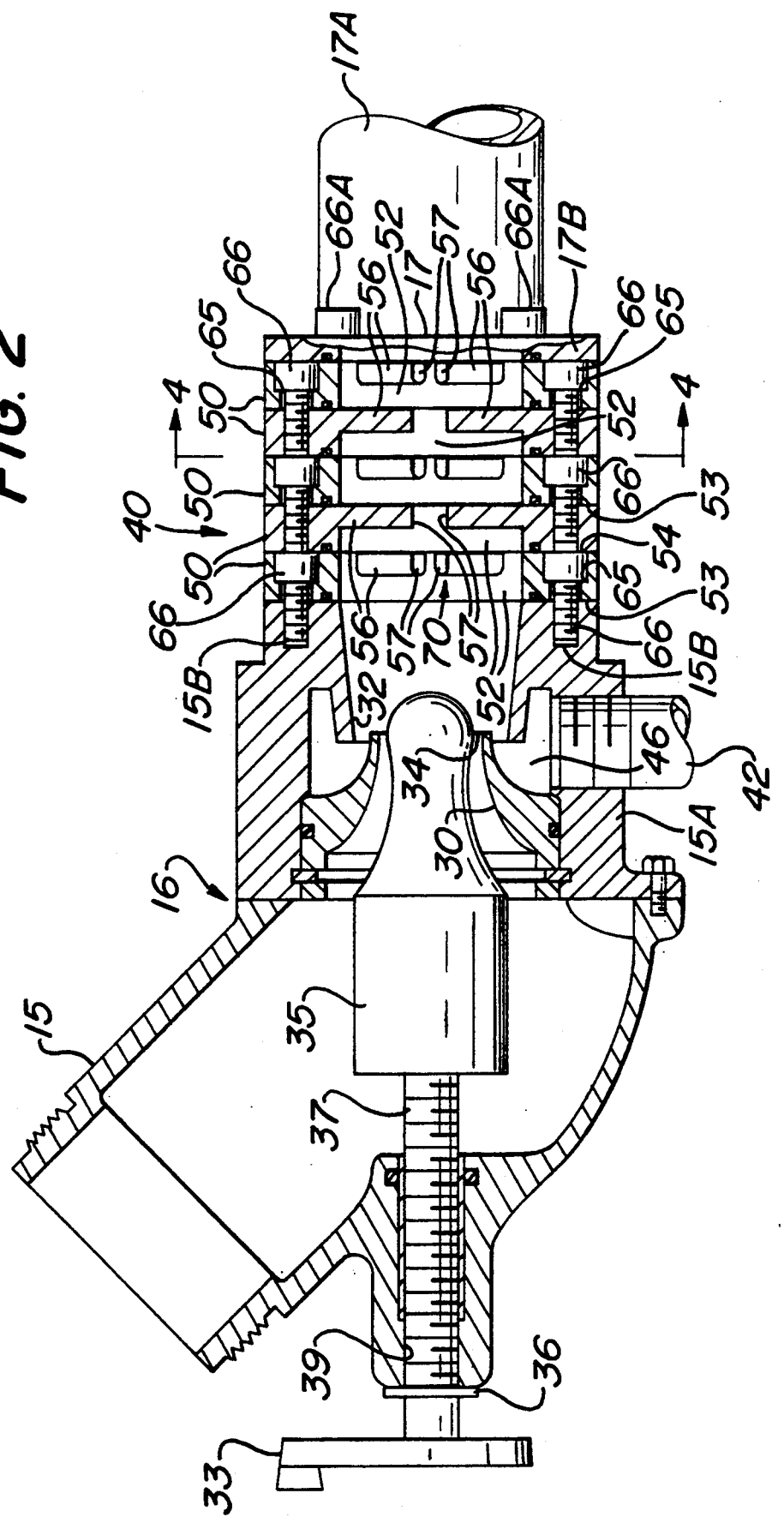
FIG. 2 is sectional view showing the mixer in accordance with the invention.

As best shown in FIG. 2, venturi means 16 comprises an inlet 15, a venturi section 15A including a converging portion 30, a diverging portion 32, and a constricted throat 34 located between portions 30 and 32 as is conventional in venturi type devices. Inlet 15 is connected to the downstream end of the conduit means 24 as shown in FIG. 1. The downstream end of discharge portion 32 is connected to direct the flow from the venturi means 16 into the mixer 40. The mixer 40 is connected at its downstream to the upstream end 17 of the fire hose 17A of the fire stream delivery means 18 as is shown in FIG. 1.

Venturi means 16 is provided with a construction whereby the flow through the venturi means 16 is adjustable. To this end, a pintle-like member 35 is mounted to extend through the converging portion 30 into the throat 34 and to be movable into and out of the converging portion 30 to provide a variable area of the throat 34. This design makes it possible to extend the range of the venturi means 16 to provide wet foam to dry foam solutions over a fairly broad flow range. This is achieved by adjusting the ratio of the amount of water and air to provide different types of foam solutions. The foam solutions are varied between a wet foam solution that has a high percentage of water and a dry foam solution that has more air than the wet foam solution.

Pintle member 35 is supported on the end of a threaded shaft 37 which is threadedly engaged in a bore 39 in the body of venturi means 16 to project therefrom. The extended end of shaft 37 has a handle 33 secured thereon for causing rotation of shaft 37 whereby the shaft 37 and pintle member 35 can be adjusted axially to various flow control positions. In FIG. 2, pintle member 35 is shown in its extreme right hand position, which occurs when a stop 36 secured on the extended end of shaft 37 comes into contact with a shoulder on the body of the venturi means 16, as shown in FIG. 2. The pintle member 35, as a result of rotation of the threaded shaft 37 by means of handle 33, can be adjusted to various positions to the left of that shown in FIG. 2. As the pintle member 35 is moved to the left away from the throat 34, the size of the flow area through the constricted throat 34 is increased. It will be noted that in its extreme right hand position, the pintle member 35 still allows a minimum amount of liquid to flow through the constricted throat 34. In the right hand position shown in FIG. 2, the venturi means 16 is set to produce the driest foam. As the pintle member 35 is moved toward the left to increase the size of the flow area through the throat 34, more water will be admitted to allow the foam solution to become wetter and wetter.

Mixer 40 is an improved type of mixer which is provided with a plurality of flange members which are provided with fingers to create turbulence without losing much pressure as the mixture of foam solution and air flow from the venturi means 16 to the upstream end 17 of the fire stream delivery means 18. The mixer 40 is particularly useful when the fire stream delivery means 18 is a deck gun where there is a minimum length of pipe between the venturi means 16 and the inlet to the fire stream delivery means 18. Mixers of this type are known in the art as motionless or stationary mixers and function to enhance mixing by adding turbulence to the flow while keeping the pressure loss to a minimum.

The fire stream delivery means 18 can take various forms, such as a deck gun or one or more fire hoses with nozzles at the end thereof. In FIG. 1, the fire stream delivery means 18 is shown as a single fire hose 17A having a nozzle 19 at the end thereof.

There is provided an air conduit means, such as that described in detail in U.S. Pat. No. 5,255,747, for delivering air to the venturi section 15A of venturi means 16. Such conduit means comprises a flow line 42 having its downstream end connected to a chamber surrounding the area of the throat 34 of the venturi section 15A of the venturi means 16 and arranged to be in flow communication with throat 34, as is best shown in FIG. 2. The flow line 42 has a check valve 44 connected therein constructed and arranged to permit flow therethrough into the chamber 46 of the venturi means 16 and to prevent flow in the opposite direction. The flow line 42 forming the air conduit means also has connected therein a control valve means 43 for controlling flow therethrough.

The air compressor 12 is arranged to deliver air at a delivery pressure to the upstream end of air conduit means. To this end, the discharge 13 of compressor 12 is connected to a compressor tank 48 which provides a supply of compressed air at the compressor discharge pressure. The upstream end of the air conduit means is connected to the compressor tank 48 to receive a supply of air at the compressor discharge pressure whereby conduit 42 delivers said air to the venturi chamber through the control valve 43 and the check valve (not shown) as described in U.S. Pat. No. 5,255,747.

Air is supplied to compressor 12 through an inlet 12A. An inlet throttling valve means 60 is constructed and arranged for varying the flow of air to the inlet 12A of compressor 12 to thereby control the compressor discharge pressure. In order to control the compressor discharge pressure, the inlet throttling valve 60 is provided with a control valve member 62 which cooperates with a valve seat to vary the amount of the air flow to the compressor inlet 12A in response to a pilot or control air pressure directed to a flow control chamber as described in U.S. Pat. No. 5,255,747. The control valve member 62 is constructed and arranged to be positioned relative to the valve seat to control the amount of air entering the air compressor 12 through inlet 12A until the output air pressure matches a desired set value of the system.

The inlet throttling valve 60 is of a type well known in the art and is shown in detail in said application and comprises control valve member 62 which is mounted for movement with a control piston guided for movement in a cylinder which defines a control chamber at the one (lower) side of the control piston. The pilot or control pressure is delivered to the control chamber by way of a passage formed in the body of valve 60, the upstream end of said passage being in flow communication with a flow line 20A communicating therewith and mounted in the side of the body of valve 60 as shown in FIG. 1. Flow line 20A delivers the pilot or control air pressure to valve 60 so that it, in effect, controls or modulates the compressor discharge pressure. The control valve member 62 cooperates with the valve seat and moves between a fully opened position and a closed position. The upstream side of the valve seat is connected to atmosphere by a inlet tube as is conventional in the art.

Flow line 20A, which delivers the pilot or control air pressure to valve 60 in order to control or modulate the compressor discharge pressure, is part of the air control means 20 which is constructed and arranged to regulate the air pressure in flow line 20A as described in U.S. Pat. No. 5,255,747. To this end, air control means 20 comprises an air pressure regulator having an air inlet, an air outlet, and a water inlet. A conduit means, comprising a flow line 81 and a selector valve is constructed and arranged for communicating the compressor discharge pressure to the air inlet of the regulator. Flow line 81 is connected between compressor tank 48 and the inlet of selector valve. Another flow line is connected between an outlet of the selector valve and the air inlet of the regulator. A conduit means, comprising flow line 20A, is constructed and arranged for communicating the air outlet of the air regulator with the passage leading to control chamber of inlet throttling valve 60. A conduit means, comprising a flow line 86, is constructed and arranged for communicating the pressure in water supply conduit means 24 to the water inlet of the regulator. To this end, flow line 86 is connected to the water conduit means 24 at a location immediately adjacent the compressor discharge 11 and has its downstream end connected to water inlet of regulator.

As described in U.S. Pat. No. 5,255,747, the air pressure regulator is constructed and arranged to vary the pressure of the air communicated by flow line 20A to the control chamber of inlet throttling valve 60 in response to both the compressor discharge pressure delivered to the air inlet of the regulator and the pump discharge water pressure delivered to the water inlet of the regulator through flow line 86 to automatically maintain the compressor air discharge pressure at a desired relationship relative to the fire pump water discharge pressure. Accordingly, the system automatically maintains a desired ratio of air and water delivered from the discharge of the venturi means 16 to the fire stream delivery means. Thus, briefly stated, the air pressure regulator takes a signal from the water pressure discharge at 11 and a signal from the air pressure discharge at tank 48 and modulates the inlet flow to the air compressor 12 to hold the water pressure and the air pressure constant, and more specifically, to match the water pressure and air pressure to maintain a balanced water pressure and air pressure, such as, for example, at a pressure of 100 PSI.

The above-described function of the air pressure regulator is achieved by a construction shown and described in detail in U.S. Pat. No. 5,255,747, the disclosure of which is incorporated herein by reference.

Compressor tank 48 is provided with a conventional pressure relief valve 49 which prevents the system from being subjected to a high pressure which could cause damage to the components thereof. By way of example, relief valve 49 is set to open the compressor tank 24 to atmosphere when the pressure in the tank 48 reaches a pressure of 200 PSI. In accordance with the invention, air control means 20 is also provided with a relief valve means.

Figure 3:
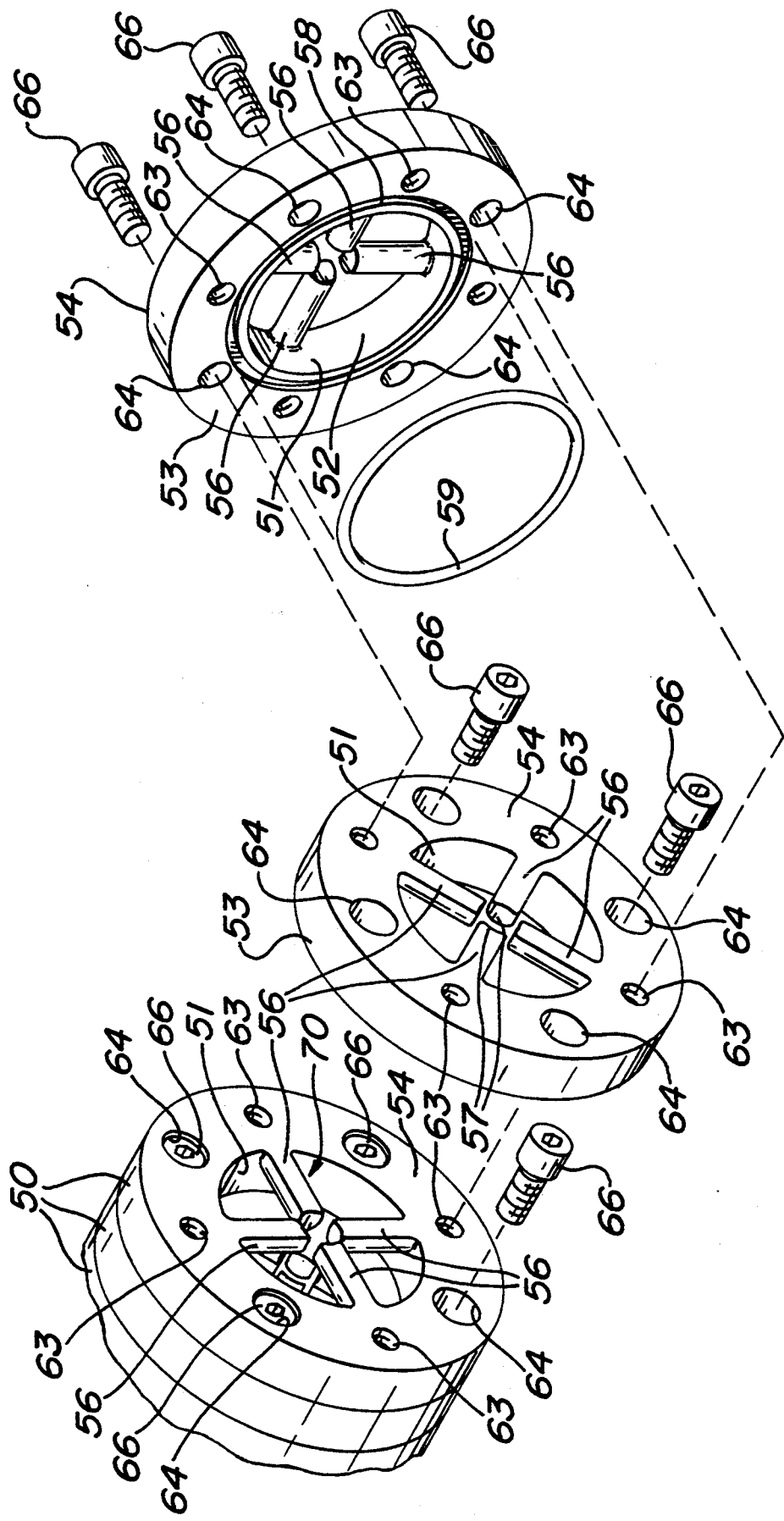
FIG. 3 is an exploded view of the mixer in accordance with the invention.
Figure 4:
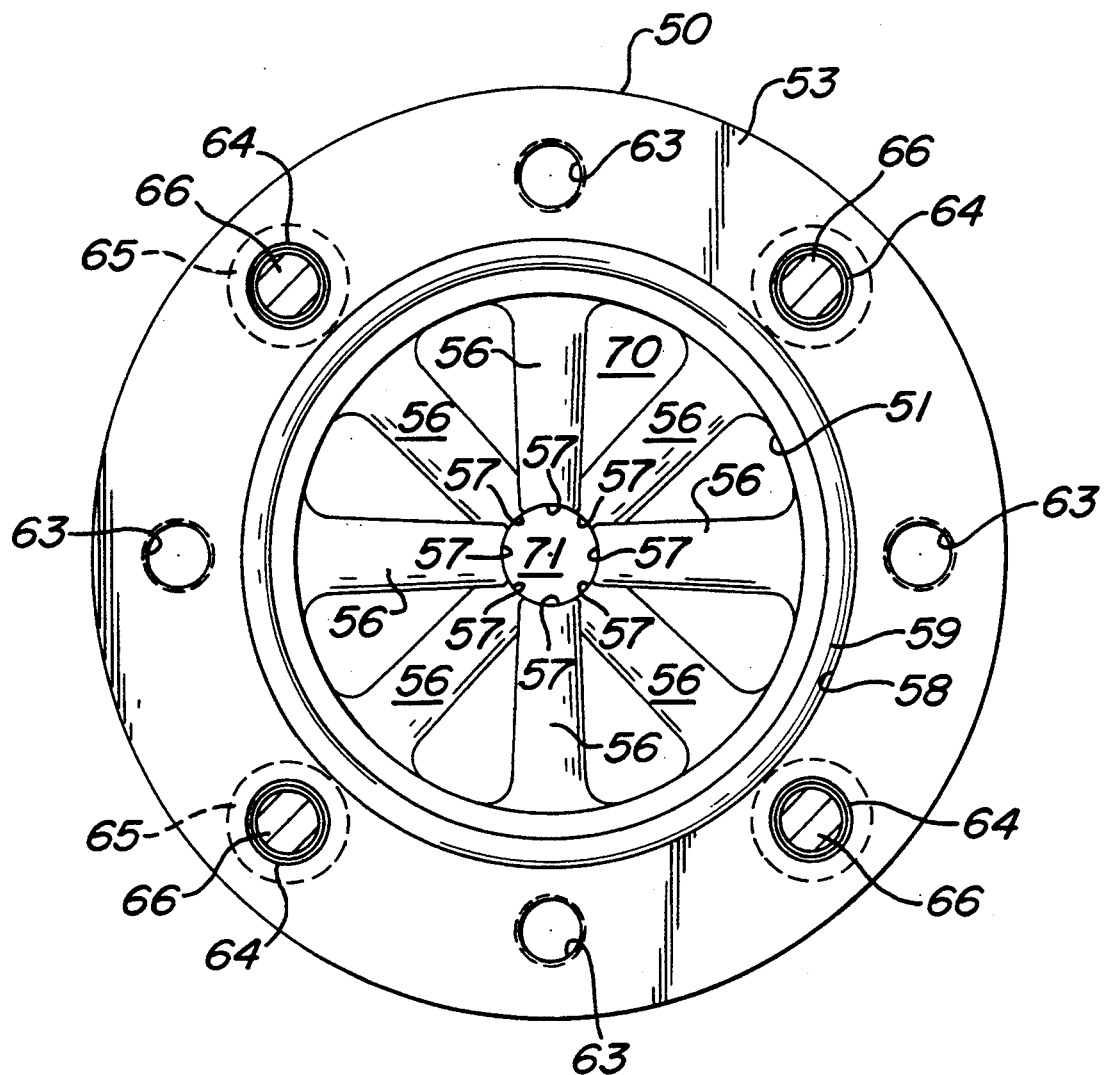
FIG. 4 is a sectional view taken on line 4—4 of FIG. 2.

The construction and arrangement of mixer 40 is shown in detail in FIGS. 2, 3, and 4. Mixer 40 comprises a plurality of flange members 50, which have an annular construction and are joined together as shown in the drawings to define a cylindrical mixing chamber 70 arranged to extend in-line between the circular opening at the downstream end of diverging portion 32 of venturi means 16 and the circular opening at the inlet 17 of the fire stream delivery means 18. In the embodiment of the invention disclosed herein, there are provided five of the flange members 50, although it would be apparent that various numbers of flange members 50 may be employed depending on the amount of mixing desired for a particular arrangement of the fire delivery means used in the compressed air foam system. Thus, more of the flange members 50 will be employed if it is necessary to achieve a greater amount of mixing in a short length.

Each flange member 50 has a generally flat annular configuration having an internal cylindrical wall 51 which defines an internal cylindrical flow passage 52 extending along the direction of flow through mixer 40 to thereby define a mixing chamber section forming part of the entire mixing chamber 70. Thus, the five flow passages 52 together define the cylindrical mixing chamber 70. Each flange member 50 has a flat annular upstream end face 53 and a flat annular downstream end face 54, said faces 53 and 54 being constructed and arranged to mate with each other when the flange members 50 are joined together to form the mixer 40 as shown in FIG. 2. Each flange member 50 comprises four projections or fingers 56 extending radially inwardly from the peripheral wall 51 of a flow passage 52 into the mixing chamber section defined thereby. As is shown in the drawings, fingers 56 are located to extend from the downstream end face 54 and are dimensioned to extend axially from face 54 approximately one-half the axial extent of the associated flow passage 52. Also, the fingers 56 are circumferentially equally spaced around wall 51 (ie., 90° apart). As best shown in FIG. 4, fingers 56 terminate at their inner ends 57 at a location to be spaced apart from the central axis of a flow passage 52 whereby there is no obstruction to fluid flow through mixing chamber 70 along its entire length in a cylindrical region 71 along the central axis of mixing chamber 70. Further, the upstream wall portions of the fingers 56 are rounded to provide a smooth surface facing the fluid flow through the mixer 40.

Means are provided for joining together the five annular flange members 50 in face-to-face relation to form the cylindrical mixer 40 as shown in the drawings. Thus, each flange member 50 is provided with four circumferentially equally spaced (90° apart) threaded mounting holes 63 extending through the annular portion of flange members 50 between faces 53 and 54, said hole 63 being radially aligned with the fingers 56. Each flange member 50 is also provided with four circumferentially equally spaced (90° apart) through holes 64 extending between faces 53 and 54, said holes 64 being spaced apart equidistantly between a pair of holes 63 as best shown in FIG. 4. Each hole 64 has an enlarged diameter counterbored portion extending axially inwardly from face 54 to provide a shoulder 65 adapted to be contacted by a corresponding shoulder on the cylindrical head of a bolt 66 used to secure a pair of flange members 50 together. Each flange member 50 has an annular groove 58 in face 53 thereof, said groove 58 being adapted to receive an O-ring seal 59 positioned therein in an arrangement to provide a fluid tight seal between a pair of mating faces 53 and 54 when a pair of flange members 50 are secured together.

The assembly of the five flange members 50 forming the mixer 40 is apparent from a consideration of the drawings and is achieved by mounting each flange member 50 in succession from left to right as viewed in FIG. 2. Thus, the left-hand flange member 50 shown in FIG. 2 is secured to the downstream end of portion 15A of the venturi means 16 by means of four of the bolts 66 which are positioned in counterbored holes 56 and extend from face 53 thereof for threaded engagement with four threaded holes 15B in the downstream end face of portion 15A, said holes 15B being located in a circumferentially equally spaced (90° apart) arrangement that is the same as the arrangement of the holes 63 in a flange member 50. The O-ring 59 in the face 53 of the first mounted flange member 50 seals the mating faces as shown in FIG. 2. A second flange member 50 is then secured onto the first-mounted flange member 50 by means of four bolts 66 which are positioned in the four counterbored holes 64 and have their threaded portions threadedly engaged in the threaded holes 63 of the first mounted flange member 50. The O-ring 59 mounted in the face 53 of the second-mounted flange member 50 provides a fluid tight seal between face 54 of the first-mounted flange member and the mating face 53 of the second-mounted flange member 50 as is apparent from the drawings. It will be apparent that by reason of the configuration of the holes 63 and 64 in each flange member 50, the second-mounted flange member will be oriented relative to the first-mounted flange member 50 with its fingers 56 in staggered relation to the fingers 56 of the first-mounted flange member 50. More specifically, the fingers 56 of the second mounted flange member 50 are turned 45° relative to the fingers 56 of the first-mounted flange member 50, as is apparent from a consideration of FIG. 4. Each of the third, fourth, and fifth flange members 50 are mounted on a previously mounted flange member 50 in the same manner as described above, with the same result that each flange member 50 has its fingers 56 staggered angularly 45° relative to the fingers 56 of an adjacent flange member 50, as is best shown in FIG. 2. The upstream end 17 of fire hose 17A is provided with a flange 17B which is secured to the right hand flange member 50 of the mixer 40 by means of four bolts 66A which secure the flange 17B to the face 54 of said right hand flange member 50 by engagement between said bolts with the threaded holes 63 in said right hand flange member 53 as can be seen in FIG. 2.

The mixer 40 is constructed and arranged to provide a very effective mixing action assuring that the compressed air and the foam solution are mixed together thoroughly as they flow therethrough to the upstream end of the fire hose 17A, said mixing producing a fluid of small foam bubbles and being free of any slug flow. Moreover, the mixing action is achieved with a minimum of pressure drop through the mixer 40. By way of example, in an actual embodiment of the invention comprising six of the flange members 50 having an outside diameter of 5¼ inches and providing a cylindrical mixer 40 having an overall length of 4½ inches with a internal mixing chamber having a diameter of about 3 inches, there was achieved a pressure drop of less than 2 psi under flow conditions comprising 250 gallons per minute.

This low pressure drop is achieved by reason of the construction and arrangement whereby the fingers 56 of flange members 50 provide turbulence in the flow stream by producing a vortex type of mixing action and because the arrangement is such that the fingers provide a minimal obstruction to the flow of the fluid through mixing chamber 70. Thus, the fingers 56 by reason of their occupying only half of the axial extent of an associated flow passage and by reason of their staggered relationship provide ample unobstructed regions for the flow of the fluid impinging upon the fingers 56. Moreover, the cylindrical central passage 71 provides an additional unobstructed flow path directly through the entire axial extent of the mixing chamber 70 of mixer 40.

As discussed in said application U.S. Pat. No. 5,255,747, the compressed air foam system is provided a safety means so that the air flow cannot be introduced into the venturi means 16 unless two things occur, namely, (1) the fire pump 10 is delivering water to conduit means 24 and (2) the foam proportioner 14 is operative to introduce foam into the system. This safety means comprises an electrical circuit means including a conventional interlock (not shown) which includes an electrical relay switch connected in series with a pressure switch 102. Pressure switch 102 is arranged to sense the water pressure at the water pump discharge 11 by means of a line 103 and closes the circuit when fire pump 10 is operative to deliver water to conduit means 24. The relay switch of the interlock is controlled by a relay circuit which includes a line that senses that the motor of the pump of foam proportioner 14 is operating and is arranged to close this relay switch. When both the relay switch of the interlock and the pressure switch 102 are closed, a safety circuit is completed.

In the use of the compressed air foam system in accordance with the invention, when the selector valve is set to the selector position wherein the pressure in compressor tank 48 is delivered through flow line 81 to the air inlet of air regulator, the system will operate to maintain the compressor discharge pressure in tank 48 at a pressure which matches the water pump pressure delivered at the discharge 11. Accordingly, when the water and foam solution is passed through the venturi section 15A of venturi means 16, it will produce a pressure drop at the throat 34 which is proportional to the flow and will draw in the desired amount of air through line 42 to mix with the water/foam solution to produce the desired wetness of the aerated foam delivered to fire stream delivery means 18. The arrangement is such that as the water flow increases it will produce a greater pressure difference between the air and water at the throat 34 of the venturi section 15A of venturi means 16 whereby the venturi means 16 functions like a carburetor and will draw in more air through flow line 42 into the flow to match the increased water flow. Accordingly, the ultimate result is that the system controls the water and air flow by balancing the water pressure and air pressure and mixing the water and air at the throat 34 of the venturi means 16 to produce the desired result. It is thus possible to achieve wetter or drier aerated foams by adjusting the size of the flow area at the throat 34 of the venturi means 16. Thus, by keeping the pressures at the water pump discharge and the air compressor discharge balanced, it is possible to vary the wetness of the aerated foam by adjusting the venturi means 16 as discussed above.

From the venturi means, the mixture of compressed air and foam flow through mixer 40 which causes the turbulent mixing thereof to produce a foam of small bubbles which foam is delivered to the fire stream delivery means 18. The mixer 40 produces an effective firefighting foam with a minimum pressure drop as described above.

Figure 5:
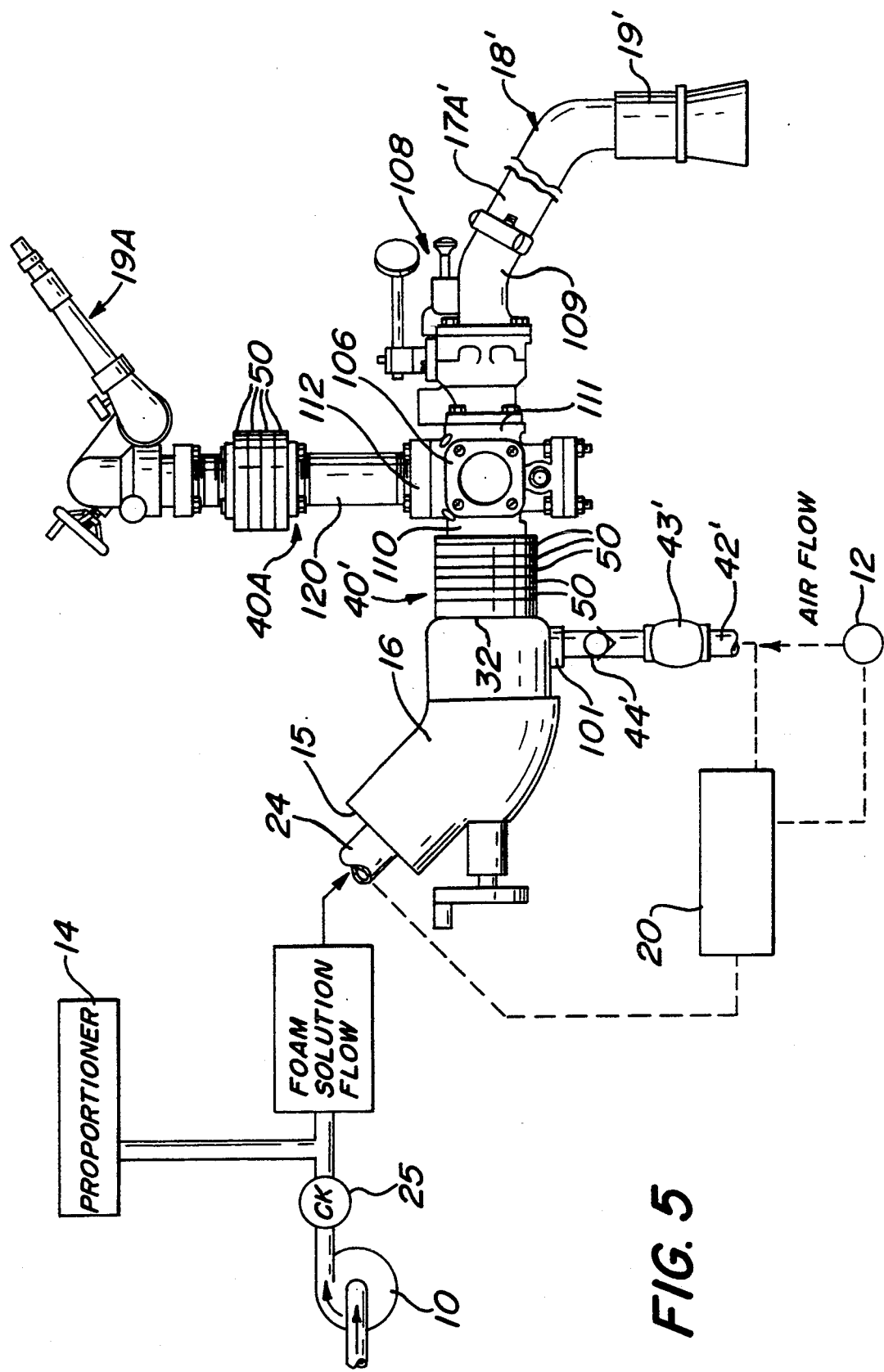
FIG. 5 is a partly schematic view of another embodiment of the invention.

FIG. 5 shows a compressed air foam system comprising another embodiment of the invention. This embodiment demonstrates the versatility of the mixer construction in accordance with the invention. The compressed air foam system shown in FIG. 5 comprises the same general arrangement as that shown in FIGS. 1 to 4, the only difference being that there is provided means for delivering the combined flow of compressed air and foam solution through a novel arrangement of mixers to a pair of fire stream delivery means. Accordingly, only the new parts of the system are illustrated in detail in FIG. 5, wherein parts corresponding to the parts of the embodiment of FIGS. 1 to 4 are given the same reference numerals with primes added. Thus, the system shown in FIG. 5 comprises the same main components of a compressed air foam system, namely, a fire pump 10, an air compressor 12, a foam proportioner 14, a venturi means 16, and an air control means 20 as shown in FIGS. 1 to 4. In the embodiment shown in FIG. 5, there is provided a modified fire stream delivery means comprising a first fire stream delivery device 18' including a fire hose 17A' and a nozzle 19', and a second fire stream delivery device including a deck gun 19A.

There is provided a water supply conduit means 24 for delivering water under pressure from the discharge of the water pump 10 to an inlet 15 of the venturi means 16 for combining the air and foam solution. Conduit means 24 is provided with a check valve 25 as described in the embodiment of FIGS. 1 to 4. Check valve 25 is constructed and arranged to permit flow in the direction to the inlet 15 of the venturi means 16 and to block flow in the opposite direction. Venturi means 16 has a foam solution inlet 15 at the downstream end of the conduit means 24 and an air inlet 101 which is connected at the downstream end of flow line 42' which corresponds to flow line 42 of the embodiment of FIGS. 1 to 4 and comprises a check valve 44' and a control valve means 43' constructed the same as the corresponding parts of the embodiment of FIGS. 1 to 4. The downstream end of the discharge portion 32 of the venturi means 16 is connected to direct the flow therefrom into a mixer 40'. Mixer 40' is essentially the same as the mixer 40 and comprises a plurality of the flange members 50 as described with respect to the embodiment of FIGS. 1 to 4.

A manifold 106 is connected between the upstream end of a conventional discharge valve 108 of the type typically employed on fire trucks and the downstream end of the mixer 40'. The manifold 106 has an inlet 110 adapted to receive the flow from the downstream end of the mixer 40' and a pair of outlets 111 and 112, outlet 111 being connected to the upstream end of discharge valve 108 and outlet 112 being connected to the upstream end of a flow conduit 120. The discharge nozzle 109 of valve 108 is connected to the upstream end of the fire hose 17A' of fire stream delivery means 18'.

The assembly of the five flange members 50 forming the mixer 40' is achieved by mounting each flange member 50 in succession from left to right as viewed in FIG. 5. The left hand flange member 50 shown in FIG. 5 is secured to the downstream end portion of the venturi means 16 by means of bolts in a manner similar to that described with respect to the embodiment of FIGS. 1 to 4. Each of the second, third, fourth, and fifth flange members 50 are mounted on a previously mounted flange member 50 in the same manner as described with respect to the embodiment of FIGS. 1 to 4. The portion of the manifold 106 providing inlet 110 is secured to the right hand flange member 50 of the mixer 40' by means of bolts to provide an arrangement as shown in FIG. 5.

The mixer 40' provides the necessary mixing action of the compressed air and foam solution to supply the fire hose 18' with said mixing producing a fluid comprised of small, uniform foam bubbles and the fluid being free of any slug flow.

The mixture of compressed air and foam solution is delivered from the manifold 106 through the second flow conduit 120 to the deck gun 19A. Since the deck gun 19A is positioned close to the manifold 106, as compared with the nozzle 19' of fire stream delivery device 18', it is necessary to provide an additional mixing action to the fluid flow. To this end, there is provided a second mixer A comprising four flange members 50 connected serially in the flow conduit 120 as shown in FIG. 5. The flange members 50 of mixer 40A are mounted in the same manner as the flange members 50 of the mixer 40' and of the mixer 40 as described above, with the two flange members 50 being oriented relative to one another with their fingers 56 in a staggered relation to one another. More specifically, the fingers 56 of the two flange members 50 are turned 45 degrees relative to one another as is described above.

The mixer 40A provides an additional mixing action to the previously mixed air and foam solution delivered from the downstream end of mixer 40' by way of the manifold 106. By reason of the arrangement of the compressed air foam system shown in FIG. 5, the desired foam of small, uniform bubbles is delivered to both the deck gun 19A and the nozzle 19' so that an effective fire fighting foam is applied to the fire as described above.

The modular construction of the mixers, in accordance with the invention, has several important advantages. Thus, the modular design allows the fire truck builder to use only the number of flange members 50 that are required to produce a mixer suitable for a particular application. Using an insufficient number of flange members 50 for the mixer can cause incomplete mixing and dangerous slug flow. On the other hand, using too many flange members 50 to comprise the mixer can cause excessive pressure drop which hurts the system efficiency and effectiveness. For example, short pipe run installations, such as a deck gun, would typically require six flange members 50 for the mixer in order to achieve a greater degree of mixing while a side discharge outlet that would receive some hose may only require four flange members 50 for the hose. Furthermore, a 100 foot pre-connect (1-¾ inch diameter) arrangement may only require two or three flange members 50 to achieve the desired mixing action. The modular design of the mixers in accordance with the invention allows the apparatus builder/designer to save critical space and money by providing the proper amount of mixing for the desired application.

The mixer construction in accordance with the invention also has important advantages in multiple discharge applications using a manifold. In this type of application, some phase separation can take place as the flows diverge and pass through multiple area changes. Thus, the foam bubbles typical in a compressed air foam system flow are broken and the air is separated from the foam solution so that the foam solution may have to be mixed before and after a manifold section. The custom modular mixers allow this "custom engineering" of mixer requirements without adding excessive pressure drop that hurts system efficiency.

What is claimed:

1. A system for supplying compressed air and foam solution to produce a fire stream of aerated foam comprising means for combining flows of the air and the foam solution to produce a flow of a fluid comprised of said air and said foam solution, said flow combining means having a foam solution inlet, an air inlet, and a motionless mixer, said mixer including a plurality of flange members Joined together to define a cylindrical in-line mixing chamber, each flange member having an internal cylindrical flow passage extending through said mixer to define a mixing chamber section forming a part of said mixing chamber, said flow passage having an internal peripheral wall, and a plurality of fingers extending radially inwardly from said peripheral wall of said flow passage into said mixing chamber section, each of said fingers being a substantially cylindrically shaped member having a rounded wall at an upstream portion thereof, said fingers being constructed and arranged to obstruct the flow of said fluid through said flow passage and cause the fluid flow to diverge around opposite sides of each finger, an axial extent of said flow passage of each flange member being substantially less than the radial extent of each flange member, said flow combining means having a downstream end, a fire stream delivery means constructed and arranged to receive the fluid flow from said downstream end of said flow combining means, a fire pump for delivering water under pressure from a discharge thereof, a water supply conduit means for delivering the water delivered from the discharge of said pump to the foam solution inlet of said flow combining means, a foam proportioner for delivering foam chemical to said water supply conduit means so that the foam solution is delivered to said foam solution inlet, an air compressor for delivering the air at a delivery pressure to a discharge thereof, and air conduit means for delivering the air from said discharge of said air compressor to said air inlet of said flow combining means.

2. A system according to claim 1 wherein said fingers of each flange member are circumferentially equally spaced apart around said flow passage thereof, and said mixer includes means for joining together said plurality of flange members in side-by-side relation in an arrangement wherein the fingers of each flange member are in staggered relation to the fingers of a flange member adjacent thereto, each of said fingers having a narrow, straight finger-shaped configuration extending radially from a base at said peripheral wall to a free end in said flow passage.

3. A system according to claim 1 wherein each of said plurality of fingers of each flange member is dimensioned to extend axially an amount less than the axial extent of said flow passage in which it is located, said fingers of each flange member being located to be at the same axial position along the longitudinal axis of said flow passage thereof and providing the only obstructions to flow through said flow passage thereof.

4. A system according to claim 1 wherein said mixer includes means for joining together said plurality of flange member in side, by, side relation, said means for joining said flange members together comprising a plurality of bolts associated with each flange member, each of said bolts having a threaded portion and an enlarged head portion, a plurality of threaded holes circumferentially equally spaced around an annular portion of each flange member, said threaded holes being adapted to be threadedly engaged by the threaded portions of a respective said bolt, and a plurality of through holes adapted to contain the respective said bolt with its threaded portion extending axially therefrom for engagement with a respective said threaded hole of an adjacent flange member, said through holes being circumferentially equally spaced and being located equidistantly from an adjacent threaded hole whereby each flange member is mounted in staggered relation to an adjacent flange member.

5. A system according to claim 1 wherein said mixing chamber has a central longitudinal axis and said fingers of each flange member extend radially inwardly to terminate at an inner end spaced apart from said central longitudinal axis of said mixing chamber whereby a generally cylindrical central passage extends through said mixing chamber throughout the entire longitudinal extent thereof, said central passage being free of any obstructions to the flow of said fluid therethrough.

6. A system according to claim 1 wherein each of said plurality of fingers of each flange member is dimensioned to extend axially an amount less than the axial extent of said flow passage in which it is located.

7. A system for supplying compressed air and foam solution to produce a fire stream of aerated foam comprising
means for combining flows of the air and the foam solution having a foam solution inlet, an air inlet, and a first motionless mixer,
said first mixer including a plurality of flange members joined together to define a cylindrical in-line mixing chamber, each flange member having an internal cylindrical flow passage extending through said first mixer to define a mixing chamber section forming a part of said mixing chamber, said flow passage having an internal peripheral wall, and a plurality of fingers extending radially inwardly from said peripheral wall of said flow passage into said mixing chamber section,
said flow combining means having a downstream end,
a fire stream delivery means constructed and arranged to receive fluid flow from said downstream end of said flow combining means,
a fire pump for delivering water under pressure from a discharge thereof,
a water supply conduit means for delivering the water delivered from the discharge of said pump to the foam solution inlet of said flow combining means,
a foam proportioner for delivering foam chemical to said water supply conduit means so that the foam solution is delivered to said foam solution inlet,
an air compressor for delivering the air under pressure from a discharge thereof, and
air conduit means for delivering the air delivered from the discharge of said air compressor to said air inlet of said flow combining means,
said fire stream delivery means including a first fire stream delivery device, a second fire stream delivery device, a first conduit means for delivering flow from the downstream end of said first mixer to said first fire stream delivery device, and a second conduit means for delivering flow from the downstream end of said first mixer to said second fire stream delivery device, said second conduit means comprising a second motionless mixer including a plurality of flange members joined together to define a cylindrical in-line mixing chamber.

8. A system according to claim 7 wherein said first fire stream delivery device comprises a fire hose and a nozzle and said second fire stream delivery device comprises a deck gun.

9. A system for supplying compressed air and foam solution to produce a fire stream of aerated foam comprising
means for combining flows of the air and the foam solution having a foam solution inlet, an air inlet, and a discharge,
a fire stream delivery means constructed and arranged to receive fluid flow from said discharge of said flow combining means,
a fire pump for delivering water under pressure from a discharge thereof,
a water supply conduit means for delivering the water delivered from the discharge of said pump to the foam solution inlet of said flow combining means,
a foam proportioner for delivering foam chemical to said water supply conduit means so that the foam solution is delivered to said foam solution inlet,
an air compressor for delivering the air at a delivery pressure to a discharge thereof,
air conduit means for delivering the air delivered from said air compressor discharge to said air inlet of said flow combining means,
said fire stream delivery means including first and second fire stream delivery devices,
first conduit means including a first motionless mixer for delivering the flow from said discharge of said flow combining means to said first fire stream delivery device, and
second conduit means including a second motionless mixer for delivering the flow from the discharge of said flow combining means to said second fire stream delivery device, said second conduit means having an upstream end connected to said first conduit means at a location downstream of said first mixer and a downstream end connected to said second fire stream delivery device, said second mixer being located between said upstream and downstream ends of said second conduit means so that flow therethrough is delivered only to said second fire stream delivery device,
said first and second mixers each comprising a plurality of flange members joined together to define an in-line mixing chamber, each flange member including a plurality of mixing members within said mixing chamber thereof.

10. A system for supplying compressed air and foam solution to produce a fire stream of aerated foam comprising
means for combining flows of the air and the foam solution having a foam solution inlet, an air inlet, and a motionless mixer, said mixer including a plurality of flange members joined together to define a cylindrical in-line mixing chamber, each flange member having an internal cylindrical flow passage extending through said mixer to define a mixing chamber section forming a part of said mixing chamber, said flow passage having an internal peripheral wall, and a plurality of fingers extending radially inwardly from said peripheral wall of said flow passage into said mixing chamber sections, said flow combining means having a downstream end, a fire stream delivery means constructed and arranged to receive fluid flow from said downstream end of said flow combining means, a fire pump for delivering water under pressure from a discharge thereof, a water supply conduit means for delivering the water delivered from the discharge of said pump to the foam solution inlet of said flow combining means, a foam proportioner for delivering foam chemical to said water supply, conduit means so that the foam solution is delivered to said foam solution inlet, an air compressor for delivering the air at a delivery pressure to a discharge thereof, and air conduit means for delivering the air from said discharge of said air compressor to said air inlet of said flow combining means, said fingers of each flange member being circumferentially equally spaced apart around said flow passage thereof, said mixer including means for joining together said plurality of flange members in side-by-side relation in an arrangement wherein the fingers of each flange member are in staggered relation to the fingers of a flange member adjacent thereto, said mixing chamber having a central longitudinal axis, each flange member having a one-piece construction including a cylindrical body portion and said fingers, said fingers of each flange member being joined to said body portion at a base of said finger and having a cross-sectional configuration symmetrical on opposite sides of a plane extending radially through said central longitudinal axis of said mixing chamber providing a radially extending wall at the upstream portion thereof diverting the flow of fluid through said flow passage thereof around opposite sides of said finger.

11. A system according to claim 10 wherein said fingers of each flange member extend radially inwardly to terminate at an inner end spaced apart from said central longitudinal axis of said mixing chamber whereby a generally cylindrical central passage extends through said mixing chamber throughout the entire longitudinal extent thereof.

12. A system according to claim 10 wherein each of said plurality of fingers of each flange member is dimensioned to extend axially an amount less than the axial extent of said flow passage in which it is located, the remainder of said flow passage being free of any flow obstructions other than said fingers.

13. A system according to claim 10 wherein said means for joining said flange members together comprises four bolts associated with each flange member, each of said bolts having a threaded portion and an enlarged head portion, four threaded holes circumferentially equally spaced around an annular portion of each flange member, said threaded holes being adapted to be threadedly engaged by the threaded portions of a respective said bolt, and four through holes adapted to contain the respective said bolt with its threaded portion extending axially therefrom for engagement with a respective said threaded hole of an adjacent flange member, said through holes being circumferentially equally spaced and being located equidistantly from an adjacent threaded hole whereby each flange member is mounted in staggered relation to an adjacent flange member.

* * * * *